J. QUIGLEY.
Animal-Trap.
No. 225,763. Patented Mar. 23, 1880.
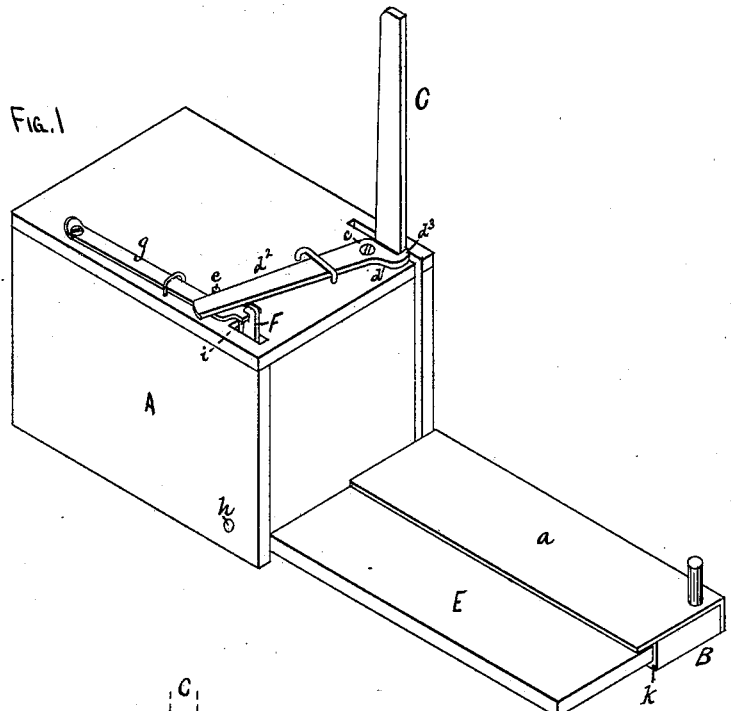
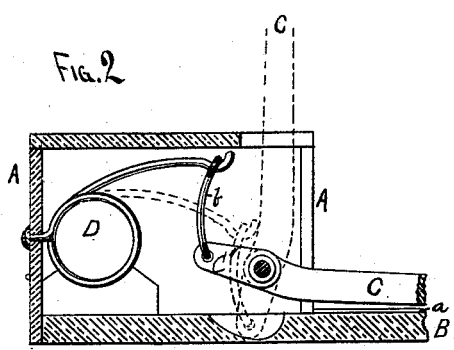
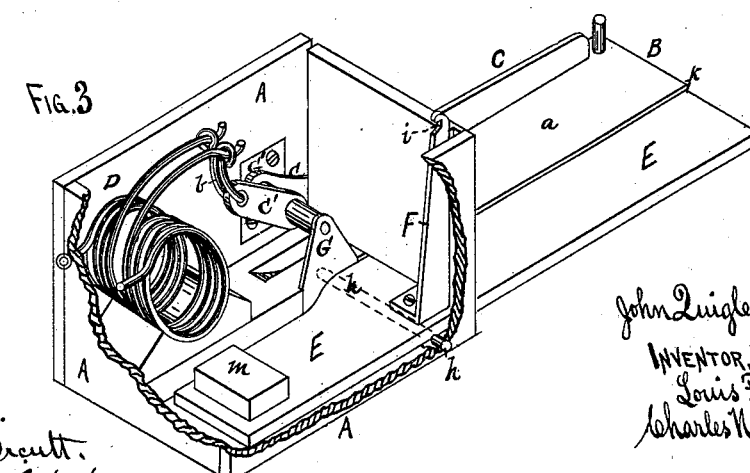
WITNESSES.
J. F. Orcutt.
Edward Robert.
John Quigley.
INVENTOR, BY
Louis Feeser
Charles N. Woodward,
Attys.

UNITED STATES PATENT OFFICE.

JOHN QUIGLEY, OF MINNEAPOLIS, MINNESOTA.

ANIMAL-TRAP.

SPECIFICATION forming part of Letters Patent No. 225,763, dated March 23, 1880.

Application filed November 8, 1879.

*To all whom it may concern:*

Be it known that I, JOHN QUIGLEY, of Minneapolis, in the county of Hennepin and State of Minnesota, have invented certain new and useful Improvements in Animal-Traps, which improvements are fully set forth in the following specification and accompanying drawings, in which—

Figure 1 is a perspective view of the trap set ready for action. Fig. 2 is a sectional side view, showing the arrangement of the springs and striking-lever. Fig. 3 is a perspective view of the trap with the top removed and a portion of the sides broken out to show the interior arrangement of the operating mechanism.

This invention relates to animal-traps; and it consists in a striking arm or lever operated by springs and adapted to be tripped by a system of levers, &c., so arranged that a very slight pressure on and movement of the levers will release the striking-arm, as hereinafter shown.

A is the casing, having a projecting platform or base, B, covered with sheet metal $a$. C is a lever, pivoted near its lower end in a bracket or frame, G, within the casing A, thereby forming a short arm, C′, which projects backward, and a long arm, which projects outward. The short arm C′ of this lever C is connected with springs D by the rod or loop $b$, by which the long arm is thrown down, its upward and downward positions being shown by full and dotted lines in Fig. 2.

Upon top of the casing A (see Fig. 1) is a bell-crank or right-angled lever, pivoted at $c$, and having a short arm, $d'$, and a long arm, $d^2$, the short arm being provided with a toe or catch, $d^3$, which catches upon the front of the striking-lever C, while the long arm $d^2$ runs across the top of the casing and rests against a short pin or stop, $e$. A spring, $g$, is secured to the top of the casing at right angles to and running beneath the long arm $d^2$, as shown in Fig. 1.

E is a long lever or treadle running parallel with the base B, and pivoted at $h$ in the lower part of the casing A, and provided with an arm, F, at right angles thereto, and running up through the top of the casing and ending with a notch, $i$, which catches on the end of the spring $g$, to hold it down and prevent its lifting the arm $d^2$ up above the stop $e$, as hereinafter explained.

The sheet-metal covering $a$ will project beyond the inner edge of the base B, to serve as a cover to the joint or crack between the base and treadle E, as shown at $k$, its object to be hereinafter explained.

The rear end of the treadle E will be provided with a weight, $m$, or other device, to keep the front end up in place beneath the sheet metal $a$, so that the treadle will not yield too readily.

The trap will be so set in a corner or in front of the holes of the animals to be caught that they will be obliged to cross the sheet-metal-covered base B, to get at the bait which will be placed upon the ground or floor on the side next the treadle.

Animals of the rat species are so extremely cautious and cunning that they will seldom touch bait fastened to anything, such as a thread, wire, or cord arranged to spring a trap upon being pulled. Hence I have arranged my trap so that the bait is entirely independent of it. Another peculiarity about these animals is that they will not cross an open crack or joint if they have any suspicions regarding it. Consequently I cover the joint between the treadle E and base B with the sheet-metal cover $a$, and arrange the treadle so that it fits up close beneath it, leaving no crack or joint visible. Again, the animals will dodge traps that are arranged so that any time elapses between the movement of the treadle or trip and the catching or striking apparatus; hence the necessity for the very delicate arrangement of the levers by which an extremely small movement of the treadle will suffice to trip the striker.

It will be observed that the arm F is so arranged that the notch $i$ comes forward of the pivot $h$, so that the upper end of the arm will begin to move downward at the same time that it moves forward, and thus release the spring $g$ much sooner and easier than it would if the notch were back of the pivot.

By my device any quantity of bait may be used, and thus suit different kinds of animals with the same trap.

One peculiar advantage of my device is that by the method shown of connecting the springs D to the striking-lever C, when the latter is raised up, as shown in Figs. 1 and 2, the line of strain of the springs runs very nearly through the pivot of the striker-arm, so that when the latter is elevated a very small power will hold it. Hence an extremely slight pressure upon the treadle will release the striker, giving the animal no time to dodge or escape.

The sheet-metal cover $a$ also prevents any scent of the killed animals remaining to arouse the suspicions of those who come after.

I do not wish to confine myself to the particular method shown of arranging the springs and levers, as I am aware that they may be arranged in many ways to accomplish the same results.

Having thus described my invention, what I claim as new, and desire to secure by Letters Patent, is—

1. The combination of the striker C, having the short arm C', springs D, and link $b$ with the lever $d'$ $d^2$, spring $g$, casing A, having the pin $e$, weighted treadle E, and arm F, having the catch $i$, substantially as described, and for the purpose set forth.

2. The combination, with the base B and treadle E, of the sheet-metal cover and shield $a$, substantially as set forth.

In testimony whereof I have hereunto set my hand in the presence of two subscribing witnesses.

JOHN QUIGLEY.

Witnesses:
J. H. BRADISH,
C. N. WOODWARD.